June 24, 1924.
R. J. PATTERSON
REAR VIEW MIRROR FOR MOTOR VEHICLES
Filed Sept. 6, 1922
1,498,572
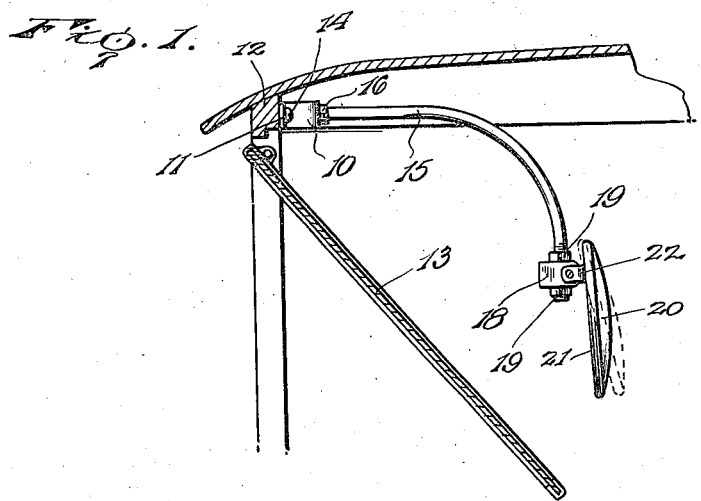
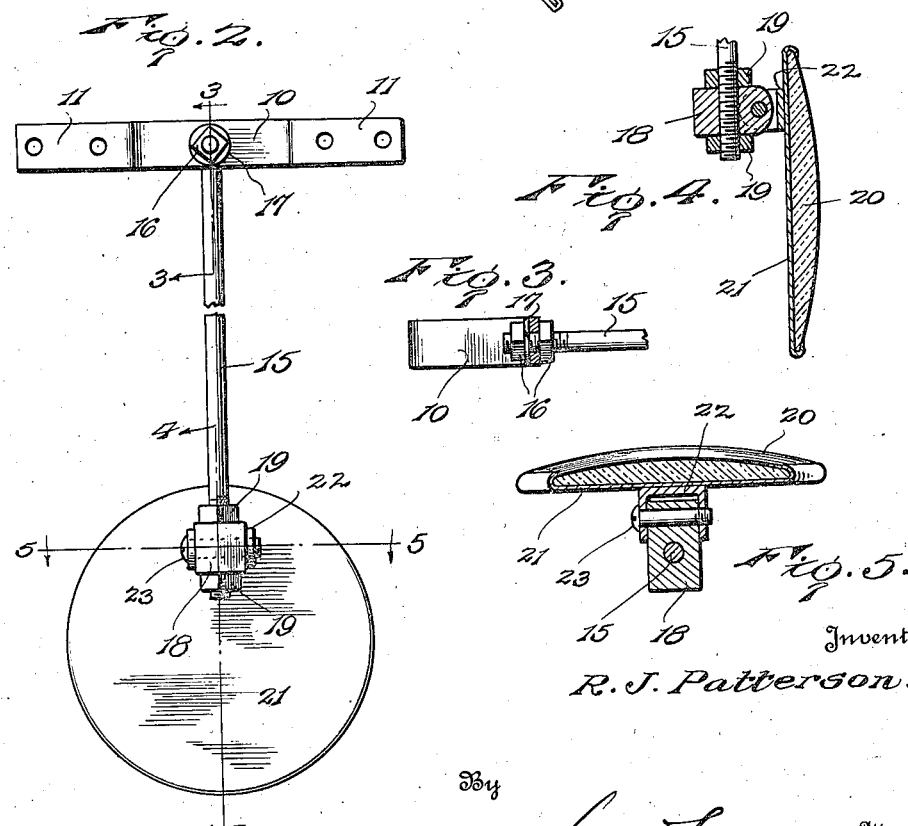

Patented June 24, 1924.

1,498,572

UNITED STATES PATENT OFFICE.

RALPH J. PATTERSON, OF OAKLAND, IOWA.

REAR-VIEW MIRROR FOR MOTOR VEHICLES.

Application filed September 6, 1922. Serial No. 586,476.

*To all whom it may concern:*

Be it known that I, RALPH J. PATTERSON, citizen of the United States, residing at Oakland, in the county of Pottawattamie and State of Iowa, have invented certain new and useful Improvements in Rear-View Mirrors for Motor Vehicles, of which the following is a specification.

This invention relates to an improved rear view mirror for motor vehicles, being particularly designed for use in connection with closed pleasure vehicles, and seeks, as one of its principal objects, to provide a device of this character which may be mounted above the vehicle wind shield in such position that traffic approaching in the rear of the vehicle will be visible through the rear window of the vehicle body reflected in the mirror.

A further object of the invention is to provide a device so constructed that when in place, the device will not interfere with the tilting adjustment of the vehicle wind shield.

And the invention has as a still further object to provide a device wherein the mirror may be readily adjusted to practically any desired angle to suit the convenience of the driver.

Other and incidental objects will appear hereinafter.

In the drawings:

Figure 1 is a fragmentary sectional view showing my improved mirror in connection with a conventional motor vehicle body.

Figure 2 is a rear elevation of the device,

Figure 3 is a sectional view on the line 3—3 of Figure 2,

Figure 4 is a detail sectional view on the line 4—4 of Figure 2, looking in the direction of the arrows, and Figure 5 is a detail sectional view on the line 5—5 of Figure 2, looking in the direction of the arrows.

In carrying the invention into effect, I employ a U-shaped supporting bracket or strap 10, the ends of which are bent to provide alined lugs 11. In Fig. 1 of the drawings, I have, for convenience, shown the device in connection with a conventional vehicle body having a front top rail 12 beneath which is mounted the usual wind shield including a tiltable upper section 13, and, as will be observed, the lugs 11 are apertured to receive screws or other suitable fastening devices 14 securing the bracket to the rail 12 at its inner side. Extending at its inner end freely through the bracket medially thereof is a rod or arm 15 upon which are threaded, as shown in Figure 3, nuts 16 confronting opposite side faces of the bracket and, preferably, a lock washer 17 is arranged beneath the innermost of said nuts. The arm 15 is curved downwardly at its outer end portion and swiveled upon the outer end of the arm is a block 18. As shown in detail in Figure 4, the block is formed with an opening therethrough freely accommodating the arm and threaded upon the arm to confront opposite side faces of the block are nuts 19. Pivotally connected to said block is a mirror 20 held by a backing plate 21 and secured to said plate near the periphery thereof is a yoke 22 straddling the block. Extending freely through one side of the yoke and the block is, as shown in Figure 5, a screw bolt 23 threaded through the opposite side of the yoke pivotally connecting the mirror with the block.

The bracket 10 is preferably mounted midway between the sides of the vehicle body so that the arm 15 will thus project rearwardly within the vehicle body for supporting the mirror 20 in convenient view from the driver's seat and, as will be readily understood in view of the preceding description, by loosening the innermost of the nuts 16, said arm may be adjustably rotated in either one direction or the other for positioning the mirror laterally either toward or away from the driver's seat. Furthermore, by loosening the lowermost of the nuts 19, the block 18 may be adjustably rotated upon the arm for positioning the mirror horizontally in angular relation with respect to the driver's seat while by loosening the pivot bolt 23 the mirror may be adjustably pivoted upon said block and thus positioned vertically. Accordingly, the mirror may be arranged at practically any angle desired with respect to the rear window of the vehicle body as well as with respect to the driver's seat for reflecting traffic approaching in the rear of the vehicle. As brought out in Figure 1, the arm 15 is of such length that the upper section 13 of the vehicle wind shield may be adjustably tilted in the ordinary manner without interference by the mirror.

Having thus described the invention, what is claimed as new is:

In a rear view mirror for motor vehicles, the combination of a rod having a straight inner end portion and terminating in an arcuately curved outer end portion, a block receiving the outer end of the rod therethrough, a mirror glass pivotally connected with said block, nuts threaded upon the outer end of the rod to confront opposite side faces of the block rotatably connecting the block with the rod whereby the mirror may be adjustably swung about the longitudinal axis of the rod and locked by said nuts, a flat metal strap having its ends offset to form attaching lugs and provided with a straight intermediate portion parallel to said lugs, the intermediate portion of the strap being provided with an opening to extend between the side faces of the strap receiving the straight inner end portion of the rod therethrough, and nuts threaded upon the inner end of the rod to confront the side faces of the strap rotatably connecting the rod with the strap whereby the rod may be turned about its longitudinal axis for adjustably swinging the mirror glass in an arc described by the outer end of the rod but in a plane parallel to the flat faces of said strap and locked in adjusted position by the latter nuts.

In testimony whereof I affix my signature.

RALPH J. PATTERSON. [L. S.]